US012654729B2

(12) United States Patent
Akanuma

(10) Patent No.: US 12,654,729 B2
(45) Date of Patent: Jun. 16, 2026

(54) VEHICLE CONTROL DEVICE AND VEHICLE CONTROL METHOD

(71) Applicant: TOYOTA JIDOSHA KABUSHIKI KAISHA, Toyota (JP)

(72) Inventor: Ryoichi Akanuma, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/744,288

(22) Filed: Jun. 14, 2024

(65) Prior Publication Data

US 2024/0416944 A1 Dec. 19, 2024

(30) Foreign Application Priority Data

Jun. 19, 2023 (JP) ................................. 2023-100024

(51) Int. Cl.
*B60W 50/14* (2020.01)
*B60W 50/08* (2020.01)
*B60W 50/10* (2012.01)

(52) U.S. Cl.
CPC .......... *B60W 50/14* (2013.01); *B60W 50/082* (2013.01); *B60W 50/10* (2013.01)

(58) Field of Classification Search
CPC .... B60W 50/14; B60W 50/082; B60W 50/10; B60W 2540/215; B60W 30/182
See application file for complete search history.

(56) References Cited

U.S. PATENT DOCUMENTS

| | | |
|---|---|---|
| 6,087,795 A | 7/2000 | Amagasa et al. |
| 2018/0229691 A1 | 8/2018 | Salter et al. |

| | | | |
|---|---|---|---|
| 2022/0379847 A1 | 12/2022 | Haibara et al. | |
| 2023/0234551 A1 * | 7/2023 | Kang ..................... | B60W 50/08 701/1 |
| 2023/0311893 A1 * | 10/2023 | An ..................... | B60W 50/08 701/1 |
| 2024/0411312 A1 * | 12/2024 | Cunningham ....... | G05D 1/0276 |

FOREIGN PATENT DOCUMENTS

| | | | | |
|---|---|---|---|---|
| DE | 102013209242 A1 * | 11/2014 | ........ | B60W 50/0098 |
| DE | 102021126458 A1 * | 4/2023 | ............... | B60T 7/12 |
| JP | H 11-70857 A | 3/1999 | | |
| JP | 2022-182883 A | 12/2022 | | |

OTHER PUBLICATIONS

Espacenet English Translation of Description of DE 102021126458 A1 (Year: 2021).*
Espacenet English Translation of Description of DE102013209242A1 (Year: 2014).*

* cited by examiner

*Primary Examiner* — James J Lee
*Assistant Examiner* — Andrew Sang Kim
(74) *Attorney, Agent, or Firm* — Finnegan, Henderson, Farabow, Garrett, and Dunner, LLP

(57) ABSTRACT

The vehicle control device includes: an acquisition unit that acquires a captured image of the in-vehicle camera or position information of the vehicle and acquires a speed of the vehicle; a specification unit that specifies the presence of the car washing machine in the vicinity of the vehicle based on the captured image or the position information of the vehicle; and a determination unit that, when the speed of the vehicle travels at a predetermined vehicle speed or less and the specification unit specifies the presence of the car washing machine in the vicinity of the vehicle, determines to propose to the driver of the vehicle a transition to the car washing mode in which the predetermined in-vehicle function is stopped.

3 Claims, 4 Drawing Sheets

VEHICLE CONTROL DEVICE AND VEHICLE CONTROL METHOD

CROSS-REFERENCE TO RELATED APPLICATION

This application claims priority to Japanese Patent Application No. 2023-100024 filed on Jun. 19, 2023, incorporated herein by reference in its entirety.

BACKGROUND

1. Technical Field

The present disclosure relates to a vehicle control device and a vehicle control method for proposing to a driver a transition to a vehicle washing mode.

2. Description of Related Art

Japanese Unexamined Patent Application Publication No. 11-70857 (JP 11-70857 A) discloses a wiper control method in an automatic wiper system in which a weather condition is sensed by a raindrop sensor to automatically control a wiper operation of a vehicle. In this wiper control method, the wiper operation control by the automatic wiper system is stopped when door mirrors are retracted, so that the wipers do not operate even when the raindrop sensor detects water droplets.

SUMMARY

It is inconvenient for a driver himself/herself to perform an operation of stopping a vehicle-mounted function at the time of washing of the vehicle. Furthermore, in the technique disclosed in JP 11-70857 A, since the door mirrors need to be retracted to stop the wiper operation control, wipers operate when the vehicle is washed with a vehicle wash machine without retracting the door mirrors, resulting in interference with the vehicle wash machine.

An object of the present disclosure is to provide a technique for stopping a vehicle-mounted function that unnecessarily operates during vehicle washing.

In order to solve the above problem, a vehicle control device according to an aspect of the present disclosure includes:

an acquisition unit that acquires a captured image of a vehicle-mounted camera or position information of a vehicle and acquires a speed of the vehicle;

a specification unit that specifies that a vehicle wash machine is present in a vicinity of the vehicle based on the captured image or the position information of the vehicle; and a determination unit that determines to propose to a driver of the vehicle a transition to a vehicle washing mode in which a predetermined vehicle-mounted function is stopped when the vehicle is traveling at a predetermined vehicle speed or lower and the specification unit specifies that the vehicle wash machine is present in the vicinity of the vehicle.

Another aspect of the present disclosure is a vehicle control method. This method is a vehicle control method causing a computer mounted in a vehicle to execute the steps of:

acquiring a captured image of a vehicle-mounted camera or position information of the vehicle and acquiring a speed of the vehicle;

specifying that a vehicle wash machine is present in a vicinity of the vehicle based on the captured image or the position information of the vehicle; and determining to propose to a driver of the vehicle a transition to a vehicle washing mode in which a predetermined vehicle-mounted function is stopped when the vehicle is traveling at a predetermined vehicle speed or lower and a specification unit specifies that the vehicle wash machine is present in the vicinity of the vehicle.

According to the present disclosure, it is possible to provide a technique for stopping a vehicle-mounted function that unnecessarily operates during vehicle washing.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
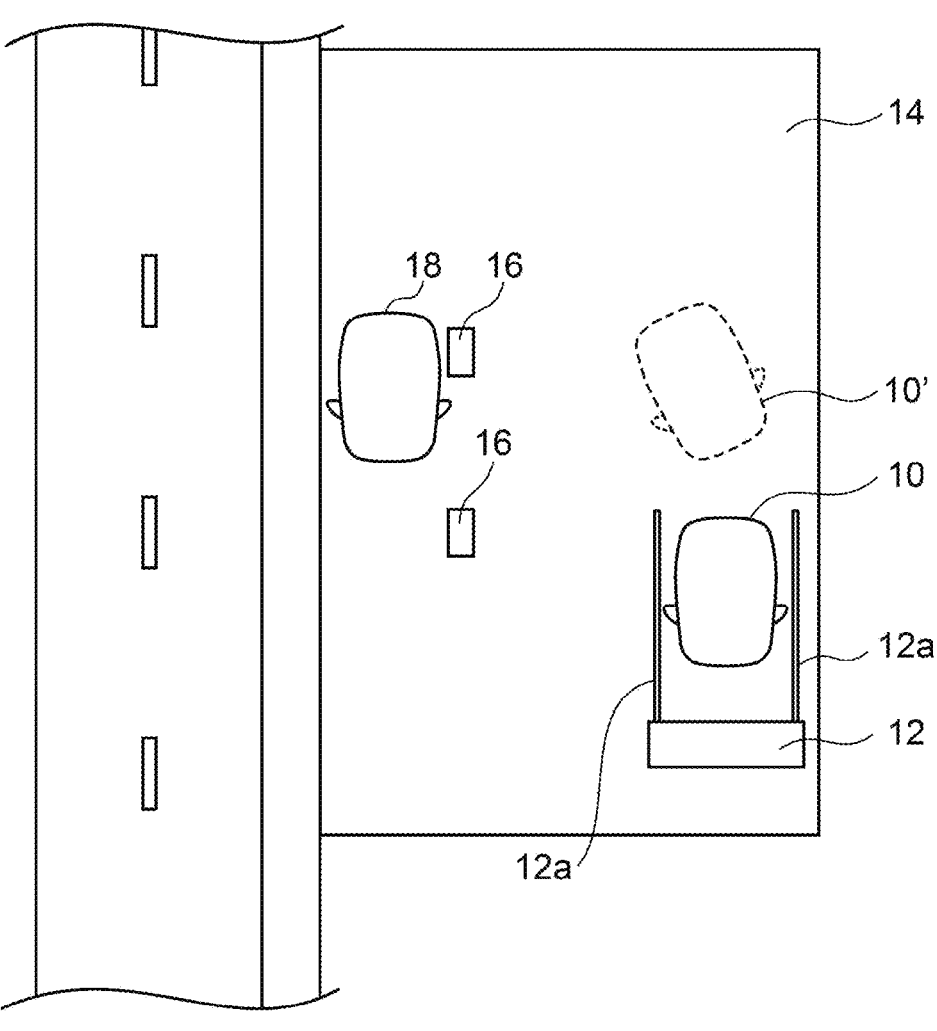
FIG. 1 shows a vehicle towards a car washing machine.

FIG. 1 is a diagram illustrating a vehicle 10 heading toward a car washing machine 12. A car washing machine 12 and a refueling machine 16 are installed in the car washing shop 14. The car washing shop 14 shown in FIG. 1 is a gas station, but may be a place dedicated to car washing without the refueling machine 16. The refueling vehicle 18 uses a refueling machine 16. The car washing machine 12 is formed in a gate-shaped configuration and moves in a pair of rail 12a during a car washing operation.

The vehicle 10 is at a car washing shop 14 for car washing. The vehicle 10 may be capable of traveling under autonomous driving control. The vehicle 10' indicated by the broken line is on the way from the road to the car washing shop 14 and is moving in front of the car washing machine 12. The vehicle 10 travels slowly in the car washing shop 14. The vehicle 10 moves in front of the car washing machine 12 and are between a pair of rail 12a. The driver receives the car washing work in the car washing machine 12 while riding on the vehicle 10.

Meanwhile, the function mounted on the vehicle 10 has a function of notifying the presence of an object such as an obstacle, and also has an automatic braking function of detecting an object approaching the vehicle 10 and automatically operating the braking device. The automatic braking function outputs an alarm in the vehicle when an object approaching the vehicle 10 is detected by, for example, a clearance sonar, and activates the braking device. At the time of car washing, the clearance sonar detects the car washing machine 12 approaching the vehicle 10, and there is a possibility that an alarm is output in the vehicle, and the driver receives an unnecessary alarm.

The automatic wiper function included in the on-vehicle function detects raindrops and automatically activates the wiper device. The wiper device is provided at least on the front door and removes water or the like. During car washing, water for car washing may be detected as raindrops, and the wiper device may be activated. At this time, there is a possibility that the wiper device hits the brush of the car washing machine 12 and causes a malfunction.

Although the specification of the vehicle 10 describes an operation of stopping the automatic wiper function at the time of car washing, the driver may not know the specification. Therefore, the vehicle control device of the embodiment proposes to the driver to shift to the car washing mode before the car washing is performed by the car washing machine 12, and prompts the driver to stop the automatic brake function, the automatic wiper function, and the like.

Figure 2:
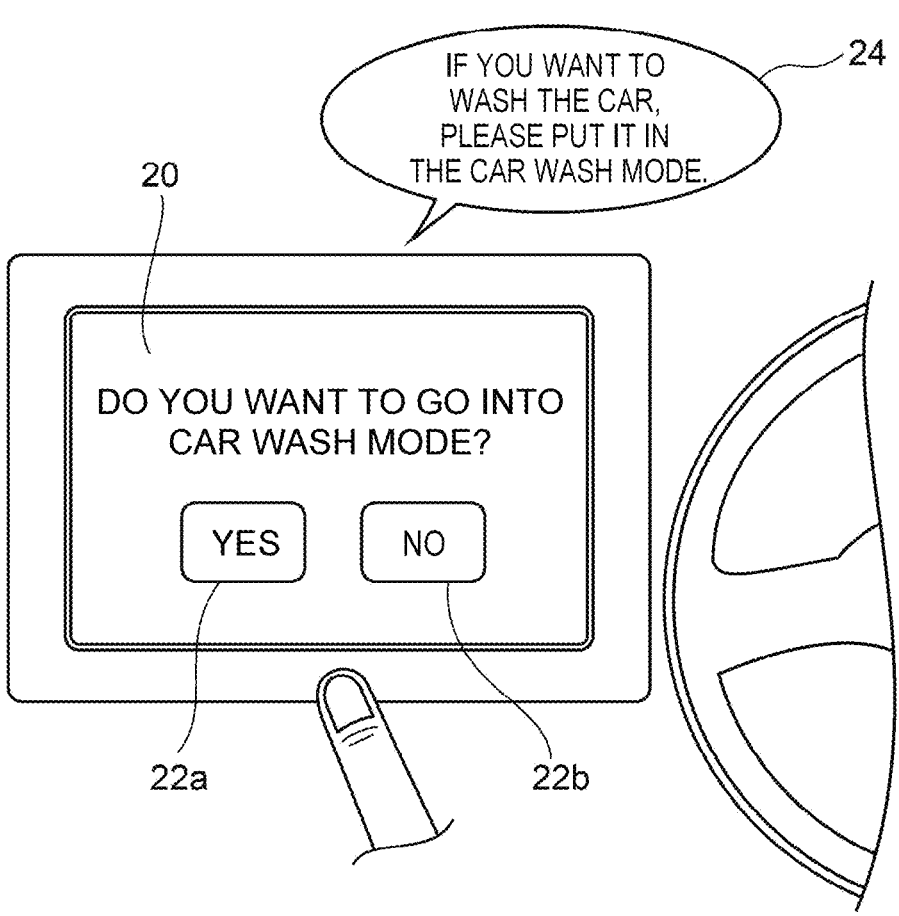
FIG. 2 is a diagram for explaining the transition to the car washing mode.

FIG. 2 is a diagram for explaining the transition to the car washing mode. FIG. 2 shows the notification unit 20, which is mainly an in-vehicle display. The notification unit 20 includes a speaker and an in-vehicle display. The in-vehicle display is of a touch panel type, and displays an image and enables an operation input by a driver.

The notification unit 20 uses the notification voice 24 to "put the car washing mode when washing the car." The driver is informed. The notification voice 24 may be repeated a plurality of times until the driver responds. In addition to outputting the notification voice 24, the notification unit 20 makes the in-vehicle display "Do you want to set the car washing mode?" Displays "Yes" operation button 22a and "No" operation button 22b. When the driver touches the operation button 22a, the vehicle control device shifts to the car washing mode, and stops the automatic braking function, the automatic wiper function, and the like.

Figure 3:
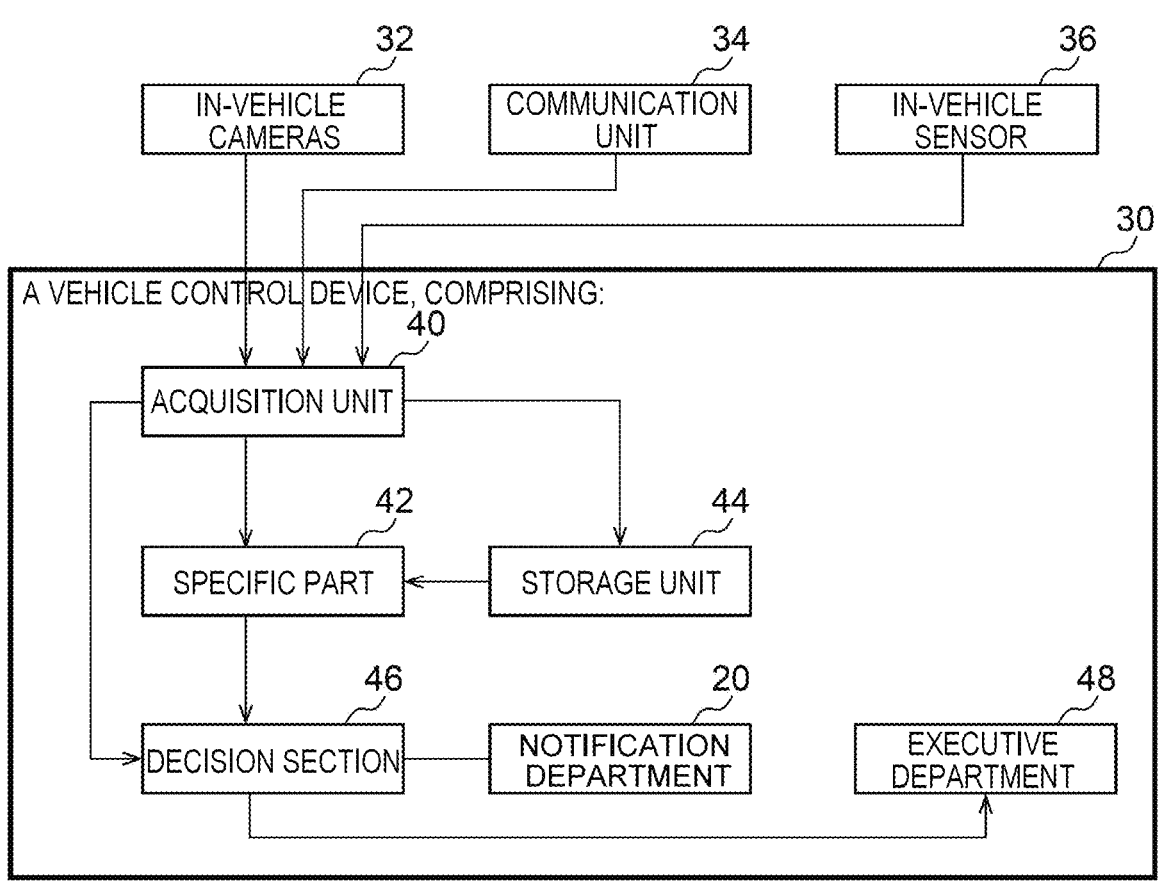
FIG. 3 is a diagram illustrating a functional configuration of a vehicle-control device.

FIG. 3 is a diagram illustrating a functional configuration of the vehicle control device 30. The functions of the vehicle control device 30 may be implemented as hardware by a circuit block, a memory, or another LSI, and may be implemented as software by system software, application programs, or the like loaded into the memory. Therefore, it will be understood by those skilled in the art that each function of the vehicle control device 30 can be realized in various forms by only hardware, only software, or a combination thereof, and is not limited to any of the forms.

The vehicle control device 30 is connected to the in-vehicle camera 32, the communication unit 34, and the in-vehicle sensor 36. The vehicle control device 30 includes an acquisition unit 40, an specification unit 42, a storage unit 44, a determination unit 46, an execution unit 48, and a notification unit 20.

The in-vehicle camera 32 captures an image of the surroundings of the vehicle 10 to generate a captured image. The in-vehicle camera 32 may include a plurality of imaging elements, and may capture images of the front, rear, left, and right directions of the vehicle 10, respectively. The in-vehicle camera 32 transmits the captured image to the vehicle control device 30.

The communication unit 34 receives information indicating the position of the vehicle 10 by using a global navigation satellite system (GNSS). Further, the communication unit 34 receives information indicating the position of the car washing machine 12 from an external server device. The communication unit 34 may include a plurality of antennas. The communication unit 34 transmits the position information of the vehicle 10 and the position information of the car washing machine 12 to the vehicle control device 30.

The in-vehicle sensor 36 includes a vehicle speed sensor that detects a speed of the vehicle 10, a touch sensor that detects an operation input of the driver, a microphone that detects a voice input of the driver, and the like. The notification unit 20 includes a speaker and an in-vehicle display as illustrated in FIG. 2.

The acquisition unit 40 of the vehicle control device 30 acquires a captured image from the in-vehicle camera 32.

The acquisition unit 40 acquires the position information of the vehicle 10 from the communication unit 34, and acquires the position information of the car washing machine 12 from the communication unit 34. The acquisition unit 40 acquires the speed of the vehicle 10 from the vehicle speed sensor of the in-vehicle sensor 36, and acquires the input result of the driver from the touch panel or the microphone of the in-vehicle sensor 36.

The specification unit 42 specifies the presence of the car washing machine 12 in the vicinity of the vehicle 10 based on the captured image and/or the position information of the vehicle 10. Note that the vicinity of the vehicle 10 may be within a predetermined distance from the vehicle 10. The predetermined distance is set by an experiment or the like, but may be set, for example, in a range of several meters to five meters.

The specification unit 42 specifies whether an image of the car washing machine 12 is included in the captured image by the image processing. The specification unit 42 may specify the car washing machine 12 from the captured image by using a machine learning method. The specification unit 42 calculates a distance between the car washing machine 12 and the vehicle 10 included in the captured image. The specification unit 42 may detect the car washing machine 12 only from a captured image obtained by capturing an image of the front of the vehicle 10.

The specification unit 42 may calculate the direction of the car washing machine 12 from the vehicle 10 based on the position of the car washing machine 12 on the captured image. The direction of the car washing machine 12 from the vehicle 10 is used to determine whether the vehicle 10 is heading toward the car washing machine 12, that is, whether the traveling direction of the vehicle 10 is heading toward the car washing machine 12. The more the front-rear direction of the vehicle 10 overlaps with the direction passing through the gate of the car washing machine 12, the more likely the vehicle 10 is to use the car washing machine 12. Thus, it is possible to determine whether the vehicle 10 uses the refueling machine 16 or the car washing machine 12.

The specification unit 42 specifies that the car washing machine 12 exists in the vicinity of the vehicle 10 when the car washing machine 12 included in the captured image is located within a predetermined distance from the vehicle 10. Further, the specification unit 42 may specify that the car washing machine 12 exists in the vicinity of the vehicle 10 when the car washing machine 12 included in the captured image is located within a predetermined distance from the vehicle 10 and the vehicle 10 is heading toward the car washing machine 12. As described above, the specification unit 42 analyzes the captured image and specifies the car washing machine 12 located in the vicinity of the vehicle 10.

The specification unit 42 specifies the presence of the car washing machine 12 in the vicinity of the vehicle 10 based on the position information of the vehicle 10 and the position information of the car washing machine 12 stored in the storage unit 44. When the positional information of the vehicle 10 and the positional information of the car washing machine 12 indicate that the positional information is equal to or smaller than the predetermined distance, the specification unit 42 specifies that the car washing machine 12 exists in the vicinity of the vehicle 10. Processing can be simplified by using the position information of the vehicle 10. The specification unit 42 may track the position information of the vehicle 10 to determine whether or not the vehicle is heading toward the car washing machine 12. The specification unit 42 may specify that the car washing machine 12 exists in the vicinity of the vehicle 10 by using both the captured image of the in-vehicle camera 32 and the position information of the vehicle 10.

When the speed of the vehicle 10 is equal to or lower than the predetermined vehicle speed and the specification unit 42 specifies that the car washing machine 12 exists in the vicinity of the vehicle 10, the determination unit 46 decides to propose to the driver of the vehicle 10 a transition to the car washing mode in which the predetermined on-board function is stopped. The predetermined vehicle speed is set to, for example, 10 kilometers per hour, and may be used to detect that the vehicle 10 is traveling slowly. This is for slow travel when the vehicle 10 is directed to the car washing machine 12. When the vehicle 10 travels slowly and the car washing machine 12 is located in the vicinity of the vehicle 10, there is a high possibility that the vehicle 10 will wash the car with the car washing machine 12, and thus a shift to the car washing mode is proposed to the driver. The vehicle 10 is in a normal running mode before going to the car washing machine 12, and various driving assistance functions are turned on.

The notification unit 20 outputs, to the in-vehicle display, information for confirming whether to shift to the car washing mode, to the driver while proposing the shift to the car washing mode to the driver according to the determination result of the determination unit 46. As illustrated in FIG. 2, the notification unit 20 notifies the proposal of the car washing mode by voice using a speaker, and causes the in-vehicle display to display an operation button for shifting to the car washing mode or obtaining the driver's approval. The notification method illustrated in FIG. 2 is a combination of a sound and a display, but the present disclosure is not limited to this embodiment, and only a sound and only a display may be notified. Further, a warning sound or the like may be further combined. In any case, the driver confirms the transition to the car washing mode. The voice notification may be repeated multiple times until the driver enters the confirmation.

When the driver inputs a "Yes" operation button 22a, that is, when the driver inputs an acknowledgement, the transition to the car washing mode is started. When the driver inputs a "No" operation button 22b, that is, when the driver inputs an indication of disapproval, the vehicle is not shifted to the car washing mode, and the proposal to the driver is terminated. As a result, it is possible to confirm whether or not the driver performs the car washing and to shift to the car washing mode. The determination unit 46 receives the result of the driver inputting the "Yes" operation button 22a, determines the transition to the car washing mode, and sends the determination result to the execution unit 48.

Upon receiving an input indicating the driver's approval, the execution unit 48 shifts to the car washing mode. The execution unit 48 completes the transition to the car washing mode by stopping the preset on-board function. The execution unit 48 can turn on/off a predetermined on-board function.

The in-vehicle function stopped in the car washing mode includes at least an automatic wiper function of automatically operating the wiper device and a function of notifying the presence of an object approaching the vehicle 10. The function of notifying the presence of an object approaching the vehicle 10 may be part of the automatic braking function. In the function of detecting and notifying an object with a clearance sonar, since it is difficult for the clearance sonar to determine the type of object than the camera, it also operates for the car washing machine 12. Therefore, the function of detecting and notifying an object by the clearance sonar is turned off at the time of car washing. Stopping (turning off)

the on-board function may only stop the control process, but may also turn off the power supply of the raindrop sensor or the clearance sonar of the wiper device together with the stop of the control process.

The specification unit 42 specifies that the vehicle 10 leaves the car washing machine 12 based on the captured image and/or the positional information of the vehicle 10. When it is determined that the vehicle 10 is away from the car washing machine 12, the determination unit 46 determines to shift from the car washing mode to the normal running mode. In response to the determination result of the determination unit 46, the execution unit 48 turns on the predetermined in-vehicle function and shifts from the car washing mode to the normal running mode. The transition from the car washing mode to the normal traveling mode is unnecessary for the driver to confirm, and it is only necessary to notify that the notification unit 20 shifts to the normal traveling mode.

Figure 4:
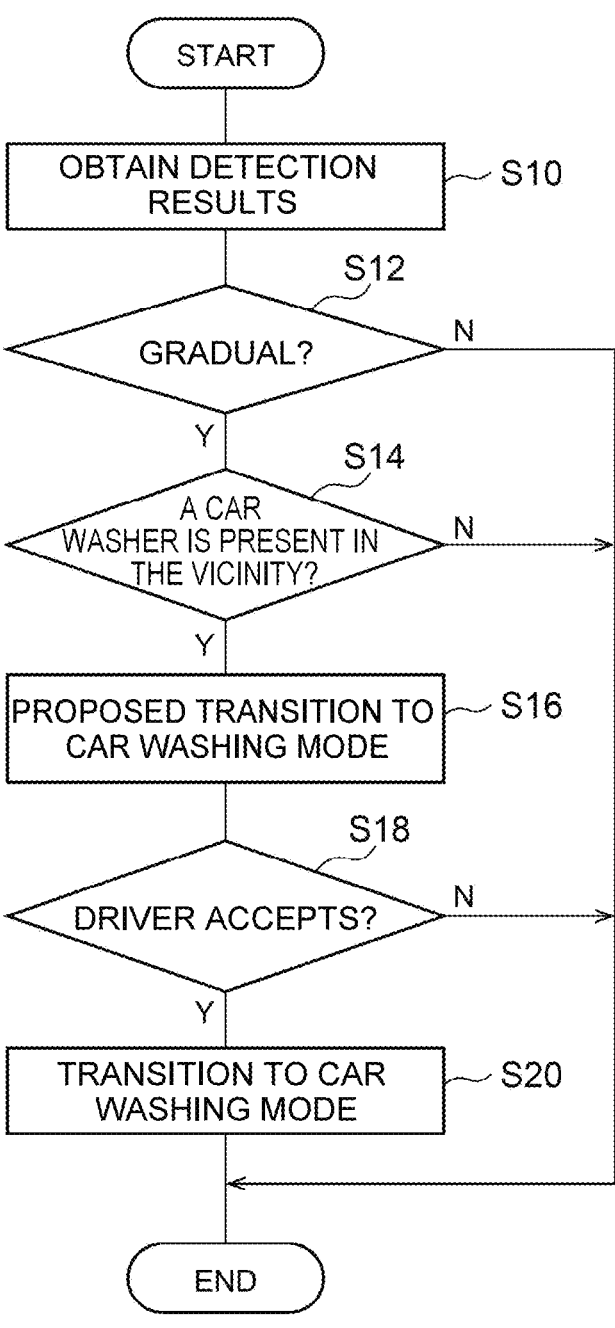
FIG. 4 is a flowchart of a vehicle control process according to the embodiment.

FIG. 4 is a flowchart of a vehicle control process according to the embodiment. The acquisition unit 40 acquires captured images from the in-vehicle camera 32, position information of the vehicle 10 from the communication unit 34, and a velocity of the vehicle 10 from the in-vehicle sensor 36 (S10).

The determination unit 46 determines whether the vehicle 10 is traveling at or below a predetermined vehicle speed, that is, whether the vehicle 10 is traveling slowly (S12). When the vehicle 10 is not traveling slowly (N in S12), this process is terminated. When the vehicle 10 is traveling slowly (Y in S12), the specification unit 42 specifies whether the car washing machine 12 exists in the vicinity of the vehicle 10 based on the captured images or the positional information of the vehicle 10 (S14).

When it is determined that the vehicle 10 is traveling at a speed equal to or lower than the predetermined vehicle speed and the car washing machine 12 is present in the vicinity of the vehicle 10, the determination unit 46 determines to propose the transition to the car washing mode to the driver of the vehicle 10, and the notification unit 20 notifies the driver of the transition to the car washing mode according to the determination (S16). The notification unit 20 confirms with the driver whether to shift to the car washing mode on the in-vehicle display while proposing the shift to the car washing mode to the driver by voice.

If the driver does not accept the transition check (N in S18), this process is terminated. If the driver does not agree, the driver presses the "No" operation button 22b and the driver does not reply to the suggestion for a predetermined period or longer. If the driver accepts the transition check (Y in S18), the determination unit 46 determines to transition to the car washing mode, and the execution unit 48 executes the transition to the car washing mode in response to the determination (S20). The execution unit 48 stops the predetermined in-vehicle function and completes the transition to the car washing mode.

The present disclosure has been described above based on examples. The present disclosure is not limited to the above-described embodiments, and various modifications such as design changes can be made based on knowledge of a person skilled in the art.

What is claimed is:
1. A vehicle comprising:
a computer configured to:
acquire a captured image of a vehicle-mounted camera or position information of a vehicle and acquire a speed of the vehicle;

specify that a vehicle wash machine is present based on the captured image or the position information of the vehicle before the vehicle has entered the vehicle wash machine; and automatically stop a vehicle-mounted function in a vehicle washing mode of the vehicle before the vehicle has entered the vehicle wash machine when the vehicle is traveling at a predetermined vehicle speed or lower and the vehicle wash machine is present, wherein the computer is further configured to:

determine whether the vehicle is traveling toward the vehicle wash machine; and determine an amount by which a front-rear direction of the vehicle overlaps with a direction passing through an entrance gate of the vehicle wash machine to determine a likelihood that the vehicle will be washed by the vehicle wash machine, and wherein stopping the vehicle-mounted function includes at least one of turning off power to a raindrop sensor associated with a wiper device of the vehicle or turning off power to a clearance sonar associated with a braking device of the vehicle.

2. The vehicle according to claim 1, wherein the computer is further configured to:

determine whether the vehicle is moving away from the vehicle wash machine based on the captured image of the vehicle-mounted camera or the position information of the vehicle; and shift the vehicle from the vehicle washing mode to a normal running mode wherein the vehicle-mounted function is turned back on when the vehicle is away from the vehicle wash machine.

3. A vehicle control method causing a computer mounted in a vehicle to execute the steps of:

acquiring a captured image of a vehicle-mounted camera or position information of the vehicle and acquiring a speed of the vehicle;

specifying that a vehicle wash machine is present based on the captured image or the position information of the vehicle before the vehicle has entered the vehicle wash machine; and automatically stopping a vehicle-mounted function in a vehicle washing mode of the vehicle before the vehicle has entered the vehicle wash machine when the vehicle is traveling at a predetermined vehicle speed or lower and the vehicle wash machine is present, wherein the method further causes the computer to execute the steps of:

determining whether the vehicle is traveling toward the vehicle wash machine; and determining an amount by which a front-rear direction of the vehicle overlaps with a direction passing through an entrance gate of the vehicle wash machine to determine a likelihood that the vehicle will be washed by the vehicle wash machine, and wherein stopping the vehicle-mounted function includes at least one of turning off power to a raindrop sensor associated with a wiper device of the vehicle or turning off power to a clearance sonar associated with a braking device of the vehicle.

* * * * *